United States Patent
Kravitz

(10) Patent No.: US 11,455,420 B2
(45) Date of Patent: Sep. 27, 2022

(54) PROVIDING TRANSPARENCY AND USER CONTROL OVER USE OF BROWSING DATA

(71) Applicant: MICROSOFT TECHNOLOGY LICENSING, LLC, Redmond, WA (US)

(72) Inventor: Lillian Kravitz, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/874,635

(22) Filed: May 14, 2020

(65) Prior Publication Data

US 2021/0357529 A1 Nov. 18, 2021

(51) Int. Cl.
*G06F 21/62* (2013.01)
*G06F 9/451* (2018.01)
(Continued)

(52) U.S. Cl.
CPC ...... *G06F 21/6245* (2013.01); *G06F 3/04847* (2013.01); *G06F 9/451* (2018.02);
(Continued)

(58) Field of Classification Search
CPC .. G06F 21/6245; G06F 3/04847; G06F 9/451; G06F 16/954; G06F 16/955;
(Continued)

(56) References Cited

U.S. PATENT DOCUMENTS 5,961,593 A * 10/1999 Gabber ............... G01M 13/021
370/329
7,120,928 B2 * 10/2006 Sheth .................... G06F 16/954
726/4
(Continued)

FOREIGN PATENT DOCUMENTS

WO 2016063092 A1 4/2016

OTHER PUBLICATIONS

Wood, Molly; Budzyn, Dana; "An app that pays you for your data? Yes, actually.", https://www.marketplace.org/shows/marketplace-tech/an-app-that-pays-you-for-your-data-yes-actually/, Sep. 26, 2019, pp. 1-13 (Year: 2019).*

(Continued)

*Primary Examiner* — Andrew L Tank
(74) *Attorney, Agent, or Firm* — Newport IP, LLC; Jacob P. Rohwer

(57) ABSTRACT

Disclosed herein is a system configured to provide a user with transparency and user control over how browsing data is shared. The system can determine that a user has initiated use of a browser. The system displays, as part of the management of browser settings in accordance with a user account, a graphical UI that presents functionality to receive input indicating whether the user allows or prevents sharing of the browsing data. The graphical UI can list the identities of data aggregators and corresponding incentives offered by each of the data aggregators in exchange for the user sharing his or her browsing data. The browser can collect the browsing data based on interactions with web sites and share (Continued)

the browsing data with individual ones of the data aggregators based on the input. Upon sharing the user browsing data, the system can enable the incentive to be provided to the user.

16 Claims, 9 Drawing Sheets

(51) Int. Cl.
  *G06F 3/04847* (2022.01)
  *G06Q 30/02* (2012.01)
  *G06F 16/954* (2019.01)
  *G06F 16/955* (2019.01)

(52) U.S. Cl.
  CPC ............ *G06F 16/954* (2019.01); *G06F 21/62* (2013.01); *G06Q 30/0215* (2013.01); *G06Q 30/0236* (2013.01); *G06Q 30/0239* (2013.01); *G06F 16/955* (2019.01)

(58) Field of Classification Search
  CPC ..... G06F 21/62; H04L 67/22; G06Q 30/0215; G06Q 30/0222; G06Q 30/0224; G06Q 30/0236; G06Q 30/0239
  See application file for complete search history.

(56) References Cited

U.S. PATENT DOCUMENTS

| | | | |
|---|---|---|---|
| 7,203,909 B1* | 4/2007 | Horvitz | G06Q 30/0256 715/765 |
| 8,301,493 B2* | 10/2012 | Sanders | G06Q 30/02 705/14.1 |
| 8,612,891 B2* | 12/2013 | Singh | G06F 21/6245 715/833 |
| 10,832,299 B1 | 11/2020 | Clauss et al. | |
| 2002/0023059 A1* | 2/2002 | Bari | H04L 63/083 705/76 |
| 2011/0083013 A1 | 4/2011 | Nice et al. | |
| 2011/0173071 A1 | 7/2011 | Meyer et al. | |
| 2012/0323794 A1 | 12/2012 | Livshits | |
| 2013/0006748 A1 | 1/2013 | Horvitz | |
| 2013/0097046 A1 | 4/2013 | Krishnamurthy et al. | |
| 2013/0174274 A1 | 7/2013 | Friedman et al. | |
| 2013/0276136 A1* | 10/2013 | Goodwin | G06Q 30/02 726/27 |
| 2013/0276142 A1* | 10/2013 | Peddada | G06F 21/62 726/28 |
| 2014/0278991 A1* | 9/2014 | Sandoval | G06Q 40/02 705/14.55 |
| 2014/0344015 A1 | 11/2014 | Puertolas-Montanes et al. | |
| 2014/0365350 A1 | 12/2014 | Shvarts | |
| 2015/0142686 A1 | 5/2015 | Baldwin et al. | |
| 2016/0034705 A1* | 2/2016 | Horvitz | H04W 12/02 726/26 |
| 2016/0191351 A1* | 6/2016 | Smith | H04L 67/10 709/219 |
| 2016/0301764 A1 | 10/2016 | Ruback | |
| 2017/0099359 A1* | 4/2017 | Bejerasco | G06F 21/6245 |
| 2017/0279616 A1* | 9/2017 | Loeb | H04L 67/02 |
| 2018/0053200 A1 | 2/2018 | Cronin et al. | |
| 2018/0343215 A1* | 11/2018 | Ganapathi | H04L 51/14 |
| 2019/0356719 A1* | 11/2019 | Povar | H04L 67/22 |
| 2021/0065882 A1 | 3/2021 | Mcleod | |
| 2021/0133196 A1 | 5/2021 | Gladwin et al. | |
| 2021/0357528 A1 | 11/2021 | Cropp et al. | |
| 2021/0409412 A1 | 12/2021 | Mohamed | |

OTHER PUBLICATIONS

Ubdi, "Universal Basic Data Income", White Paper and Presentation, Jan. 2019, pp. 1-53 (Year: 2019).*

"International Search Report and Written Opinion Issued in PCT Application No. PCT/US2021/022273", dated May 28, 2021, 14 Pages.

"International Search Report and Written Opinion Issued in PCT Application No. PCT/US21/022270", dated Jun. 28, 2021, 10 Pages.

"Non Final Office Action Issued in U.S. Appl. No. 16/874,629", dated May 25, 2022, 18 Pages.

* cited by examiner

FIG. 3D

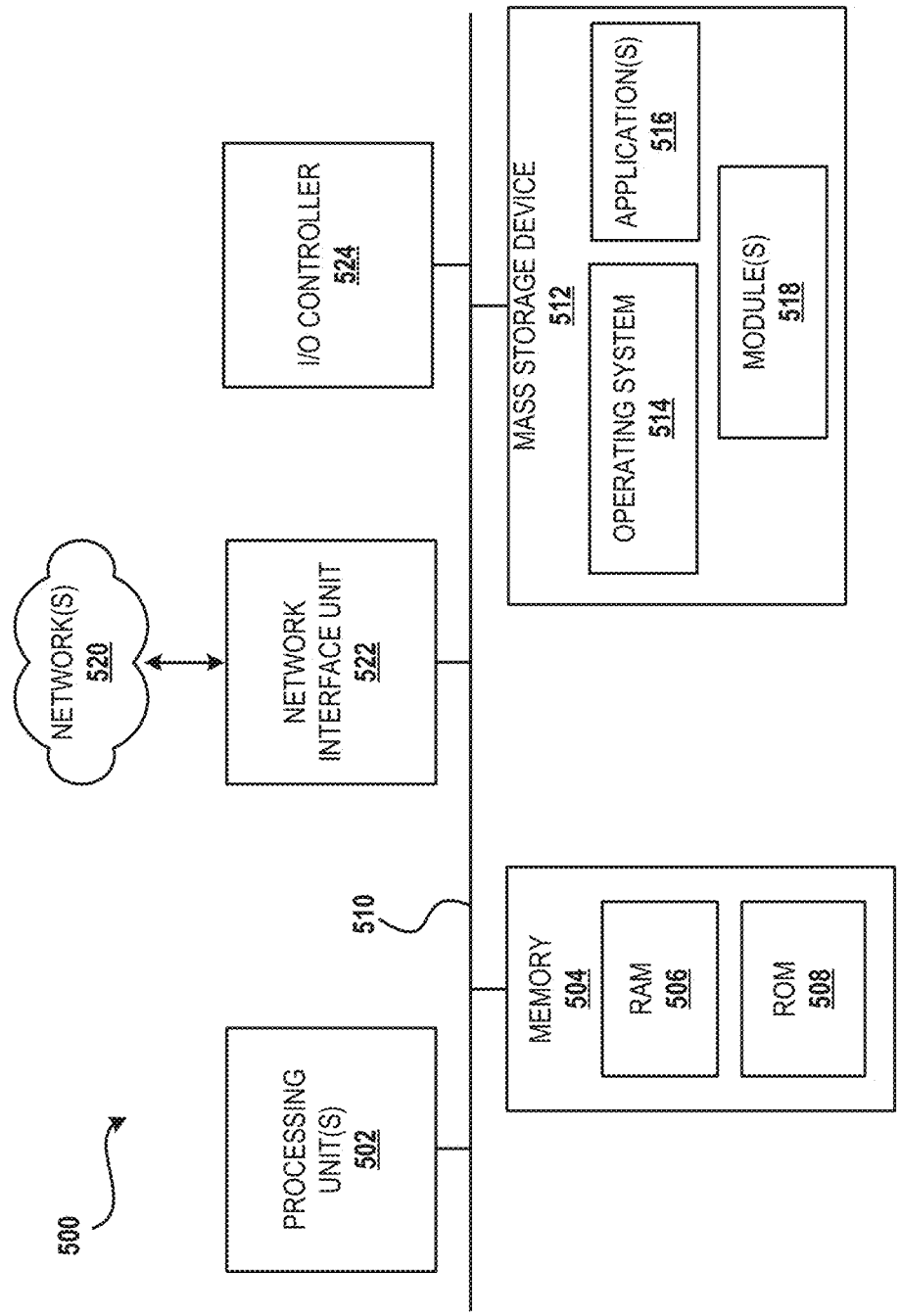

PROVIDING TRANSPARENCY AND USER CONTROL OVER USE OF BROWSING DATA

BACKGROUND

Currently, network entities that provide and/or host network-based resources (e.g., a web site, a browser, etc.) enable third party trackers (e.g., cookies, scripts, etc.) to scrape data about users when the users use the network-based resources. The scraped data is often shared and/or sold by companies that develop these third party trackers so that the data can be used for various reasons, such as targeted advertising. This typically happens behind the scenes unbeknownst to the users of the network-based resources.

While some network-based resources offer and/or enable the use of extensions or plugins to prevent the execution of third party trackers on browsers, these extensions or plugins are largely ineffective because they can block access to network content that is pertinent to the users and/or they can cause errors and prompts that frustrate the user experience. The data scraped by third party trackers is also often used to make incorrect conclusions or presumptions with regard to user interests or user circumstances, which can further frustrate the user experience. As an illustrative example, a non-parent user may have purchased an outfit for a newborn niece online. This purchase data is obtained and noted by a third party tracker. Subsequently, this purchase data is incorrectly used to presume that the non-parent user has a newborn child. Accordingly, targeted advertisements for baby clothes are displayed for the user for an extended period of time (e.g. over the next two to three weeks), even though the user is not currently a parent and the purchase of the newborn outfit was a one-time occurrence. That is, the non-parent user has no further interest in purchasing additional baby clothes.

Accordingly, users have limited or no control over how the data they generate by interacting with network-based resources is used, and the example in the preceding paragraph is but one illustration of how this may frustrate the user experience. This type of activity naturally concerns organizations (e.g., governments, consumer protection groups, etc.) that have a strong interest in protecting user data in accordance with user wishes.

It is with respect to these and other considerations that the disclosure made herein is presented.

SUMMARY

The techniques disclosed herein describe a system configured to provide a user with transparency and user control over how browsing data is shared. The system configures and displays various graphical user interfaces (UIs) that enable users to provide input with regard to how their browsing data is shared. Based on the user input, the system can collect and share the users' browsing data with various entities that aggregate the data.

Aggregation of users' browsing data by third party data aggregators can provide some clear benefits to individual users and/or the general population. For example, some users that enjoy obtaining various products over the Internet welcome targeted advertising. However, as described above, the use of users' browsing data by third party data aggregators can also expose vulnerabilities with respect to privacy and/or frustrate the user experience. Accordingly, the techniques described herein provide users with transparency and control over how their browsing data is used. In the context of this disclosure, the use of "first party" corresponds to a network entity that provides and/or hosts a network-based resource, such as a browser or a web site.

Users and corresponding user devices may be referred to herein as "data generators", as they are the ones that generate valuable browsing data that, in accordance with user permission, can be shared by the first party network entities to third party data aggregators for the benefit of individual users and/or the general population. A third party data aggregator is likely a company or organization with an objective of collecting a large amount of user browsing data from a large number of web sites to create "rich" data feature sets. A data consumer is a company that may work with the third party data aggregator to use these rich data feature sets to draw a conclusion. For instance, a data consumer may be a company that hosts a single web site (e.g., "www.shoppingcompanyABC.com"). Accordingly, while this example data consumer may collect and use its own user data based on interactions with its own web site and in accordance with user approval, the data consumer may want to execute a data query on a richer data set that it does not, or cannot, possess (e.g., "What are the most popular shoes for teenage males?"). Hence, the data consumer may take the necessary steps to access a rich data feature set collected and maintained by a third party data aggregator to obtain a more robust data conclusion. In some examples, the data aggregator is a data consumer, e.g., a company that displays advertisements on various web sites.

As described above, once a user generates data by using a browser to access and interact with a web site, the use of this data is often opaque to the user. The system described herein implements a browser experience that enable users to allow or prevent the sharing of their browsing data with third party data aggregators. The disclosed techniques alleviate the conventional use of third party trackers that scrape data from various web sites, as now entities that implement these third party trackers can receive users' browsing data directly from a first party browsing service in accordance with user permissions. Consequently, device performance is improved because third party trackers typically cause a degradation in the browsing experience (e.g., slower web site loading times) due to the unnecessary resource consumption (e.g., processing power, memory space, etc.) needed to execute scripts and cookies in the background. Stated alternatively, the disclosed techniques provide a way for the third party data aggregator to obtain large amounts of data in a manner that is focused on user privacy since suspicious scripts and/or cookies no longer have to be executed in the background.

The system described herein is fully transparent in that third party data aggregators requesting access to a user's browsing data are identified in a graphical UI. Moreover, a user can completely control the data that is shared to individual ones of the identified third party data aggregators. For example, a user can define specific web sites for which browsing data can be shared and/or different categories of web sites for which browsing data can be shared. Further, a user can define whether any personal information (e.g., age, gender, recreational interests, etc.) is associated with, or supplements, the shared browsing data.

The system is further configured to provide an incentive for the user to share browsing data. In one example, the incentive can include a free or discounted subscription to an online publication. In another example, the incentive can include a cash back reward on any items bought via displayed advertisements. Many users would likely be interested in the techniques described herein because they know that their browsing data is already being used and/or shared beyond their control. Accordingly, the transparency and newly added control described herein would likely be welcomed, particularly since incentives can also be provided to the users. Further, in addition to not having to scrape for data using trackers, third party data aggregators can also benefit from more rich data feature sets, since a large amount of user browsing data is handed over in accordance with user permissions.

As described herein, the system can determine that a user has initiated use of a browsing component. In one example, the system can provide a pop up notification that informs the user of browser settings related to the exchange of browsing data and incentives. The system can display, as part of the management of browser settings in accordance with a user account, a graphical UI that presents functionality to receive input indicating whether the user allows or prevents sharing of the user browsing data. The graphical UI can list the identities of one or more data aggregators and corresponding incentives offered by each of the data aggregators in exchange for the user sharing his or her browsing data. The browsing component can collect the user browsing data based on interactions with a plurality of web sites and share the user browsing data with individual ones of the data aggregators based on the input. Upon sharing the user browsing data, the system can enable the incentive to be provided to the user.

The system enables the user to provide input at various level of granularity. For example, the graphical UI can provide an option for the user to generally authorize the sharing of all of his or her browsing data with any data aggregator. In another example, the graphical UI can provide options for the user to authorize the sharing of browsing data for individual ones of a plurality of categories of web sites with individual ones of the identified data aggregators. Web site categories can be broadly or narrowly defined and can include, for example: news sites (e.g., sports news sites, political news sites, financial news sites, etc.), streaming sites, shopping sites, travel sites, health sites, social networking sites, educational sites, etc.

In yet another example, the graphical UI can provide options for the user to authorize the sharing of browsing data for individual ones of a plurality of websites (e.g., the most common web sites visited by the user) with individuals ones of the identified data aggregators. Further, the graphical UI can provide options for the user to authorize the sharing of personal information (e.g., age or age range, a gender or gender identification, ethnicity, a profession, an income level, family information, personal interests, etc.) to supplement the user browsing data shared with the data aggregators. While the techniques described herein can be implemented on user browsing data that is not supplemented with personal information, the personal information provides value when it supplements the user browsing data.

In various examples, the system can display a notification to the user while the user is browsing a specific web site. The notification can indicate that browsing data for the specific web site is going to be shared with the data aggregator in accordance with previously provided input. In some implementations, the notification can provide the user with a one-time opportunity to prevent the sharing of the browsing data for the specific web site.

As mentioned above, provision of the incentive can be enabled by an entity that provides a browsing service. Accordingly, the user may be logged into a registered user account and the described system can serve as an "exchange" platform that enables the valuable user browsing data to be passed to a data aggregator in accordance with user permissions in exchange for the incentive offered by the data aggregator based on browsing operations by the user. For example, a free subscription to a media service may be applied to the registered user account so that the user can consume content that is typically behind a pay wall. In another example, cash back or a discount can be applied when a purchase is made via advertisements displayed via the browser and/or specific web sites. Accordingly, the first party network entity that offers the browsing service to users and the data aggregator may have a partnership to enable the exchange.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3D is an example graphical UI illustrating functionality to receive input indicating whether the user allows or prevents sharing of the user browsing data at a more granular level.

FIG. 5 is a computer architecture diagram illustrating an illustrative computer hardware and software architecture for a computing system capable of implementing aspects of the techniques and technologies presented herein.

DETAILED DESCRIPTION

The following Detailed Description discloses techniques and technologies for providing a user with transparency and user control over how browsing data is shared. The disclosed system can determine that a user has initiated use of a browsing component. In one example, the system can provide a pop up notification that informs the user of browser settings related to the exchange of browsing data and incentives. The system can display, as part of the management of browser settings in accordance with a user account, a graphical UI that presents functionality to receive input indicating whether the user allows or prevents sharing of the user browsing data. The graphical UI can list the identities of one or more data aggregators and corresponding incentives offered by each of the data aggregators in exchange for the user sharing his or her browsing data. The browsing component can collect the user browsing data based on interactions with a plurality of web sites and share the user browsing data with individual ones of the data aggregators based on the input. Upon sharing the user browsing data, the system can enable the incentive to be provided to the user.

Various examples, scenarios, and aspects of the disclosed techniques are described below with reference to FIGS. 1-5.

Figure 1:
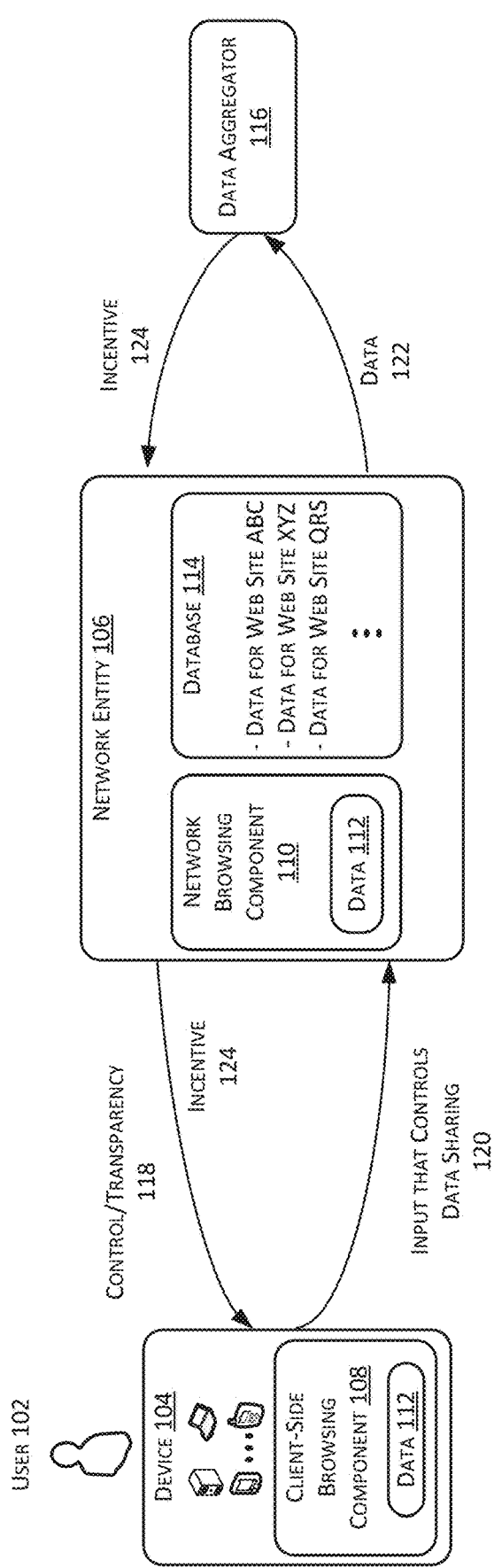
FIG. 1 is a diagram illustrating an example environment in which various entities described herein can interact in order to provide users with transparency and control with regard to how their browsing data is shared.

FIG. 1 is a diagram illustrating an example environment 100 in which various entities described herein can interact in order to provide users with transparency and control with regard to how their browsing data is shared. As shown in FIG. 1, a user 102 and a corresponding user device 104 make up a data generator based on the use of a browsing component. A browsing service is offered by a network entity 106, and thus, functionality of the browsing component can be implemented on one or both of a client-side browsing component 108 and a network browsing component 110. Based on the use of, and/or the interactions with, the browsing components 108 and 110, valuable browsing data 112 is generated. As described above, this browsing data 112 can be used to benefit individual users, the general population, or a subset of the general population (e.g., a particular age group, a particular gender, a particular income level, those who travel frequently, those who commute to work, etc.).

The browsing data 112 can be generated based on active input (e.g., network interactions such as clicks or scrolling) or monitored input based on sensors (e.g., gaze direction, user movements, biometric data, etc.). The browsing data 112 of the user 102 is collected and securely stored by the network entity 106 in a data storage resource, such as a database 114, configured to protect the browsing data 112 from external access. That is, data privacy mechanisms are implemented so that external entities cannot view the user's browsing data 112, which includes data for web site ABC, data for web site XYZ, data for web site QRS, and so forth. Based on the expansive and everyday use of the Internet, it is noted that a large amount of user browsing data can be collected and stored for an individual user 102 over a period of time.

A third party data aggregator 116 includes an external network entity that, for various reasons or purposes, want to obtain and/or analyze the user browsing data collected by the network entity 106. The third party data aggregator 116 is likely a company or organization with an objective of collecting a large amount of user browsing data from a large number of web sites to create "rich" data feature sets. A data consumer is a company that may work with the third party data aggregator to use these rich data feature sets to draw a conclusion. For instance, a data consumer may be a company that hosts a single web site (e.g., "www.shoppingcompanyABC.com"). Accordingly, while this example data consumer may collect and use its own user data based on interactions with its own web site and in accordance with user approval, the data consumer may want to execute a data query on a richer data set that it does not, or cannot, possess (e.g., "What are the most popular shoes for teenage males?"). Hence, the data consumer may take the necessary steps to access a rich data feature set collected and maintained by a third party data aggregator 116 to obtain a more robust data conclusion. In some examples, the data aggregator 116 can be a data consumer, e.g., a company that displays advertisements on various web sites.

As described above, once the user 102 and the user device 104 generate the browsing data 112 by using and interacting with a browsing service, the further use of this browsing data 112 is typically opaque to the user 102. Accordingly, the network entity 106 that hosts the browsing service is configured to provide the user 102 with control and transparency 118 with regard to how their browsing data 112 is to be shared. As further described herein, various graphical user interfaces (UIs) can be displayed that enable the user 102 to provide input 120 that controls the extent to which his or her browsing data 112 is shared by the network entity 106. Based on the user input, the system can collect and share the user's browsing data 122 with the data aggregator 116.

Consequently, the network entity 106 implements a browser experience that enables the user 102 to allow or prevent the sharing of his or her browsing data 112 with third party data aggregators. This approach alleviates the conventional use of third party trackers that scrape data from various web sites, as now the data aggregator 116 can receive the user's browsing data directly from the first party network entity 106 that hosts a browsing service, in accordance with user permissions. Further, this approach improves device performance because third party trackers typically cause a degradation in the browsing experience (e.g., slower web site loading times) due to the unnecessary resource consumption (e.g., processing power, memory space, etc.) needed to execute scripts and cookies in the background.

In various embodiments, the network entity 106 is configured to enable the provision of an incentive 124 to the user 102 in exchange for the user permitting the sharing of the browsing data 112. As shown, the incentive 124 can come from the data aggregator 116. In one example, the incentive 124 can include a free or discounted subscription to an online publication. In another example, the incentive 124 can include a cash back reward on any items bought via displayed advertisements. Many users would likely be interested in the techniques described herein because they know that their browsing data is already being used and/or shared beyond their control. Accordingly, the transparency and newly added control described herein would likely be welcomed, particularly since incentives 124 can also be provided to the users.

Further, in addition to not having to scrape for data using trackers, third party data aggregators can also benefit from more rich data feature sets, since a large amount of user browsing data is handed over in accordance with user permissions. For instance, in accordance with the conventional approach, and for various reasons, the data aggregator may have only been able to implement a tracker for web site ABC and web site XYZ, and not web site QRS. In the example shown in FIG. 1, the data aggregator 116 receive the browsing data for each of web site ABC, web site XYZ, and web site QRS.

Figure 2:
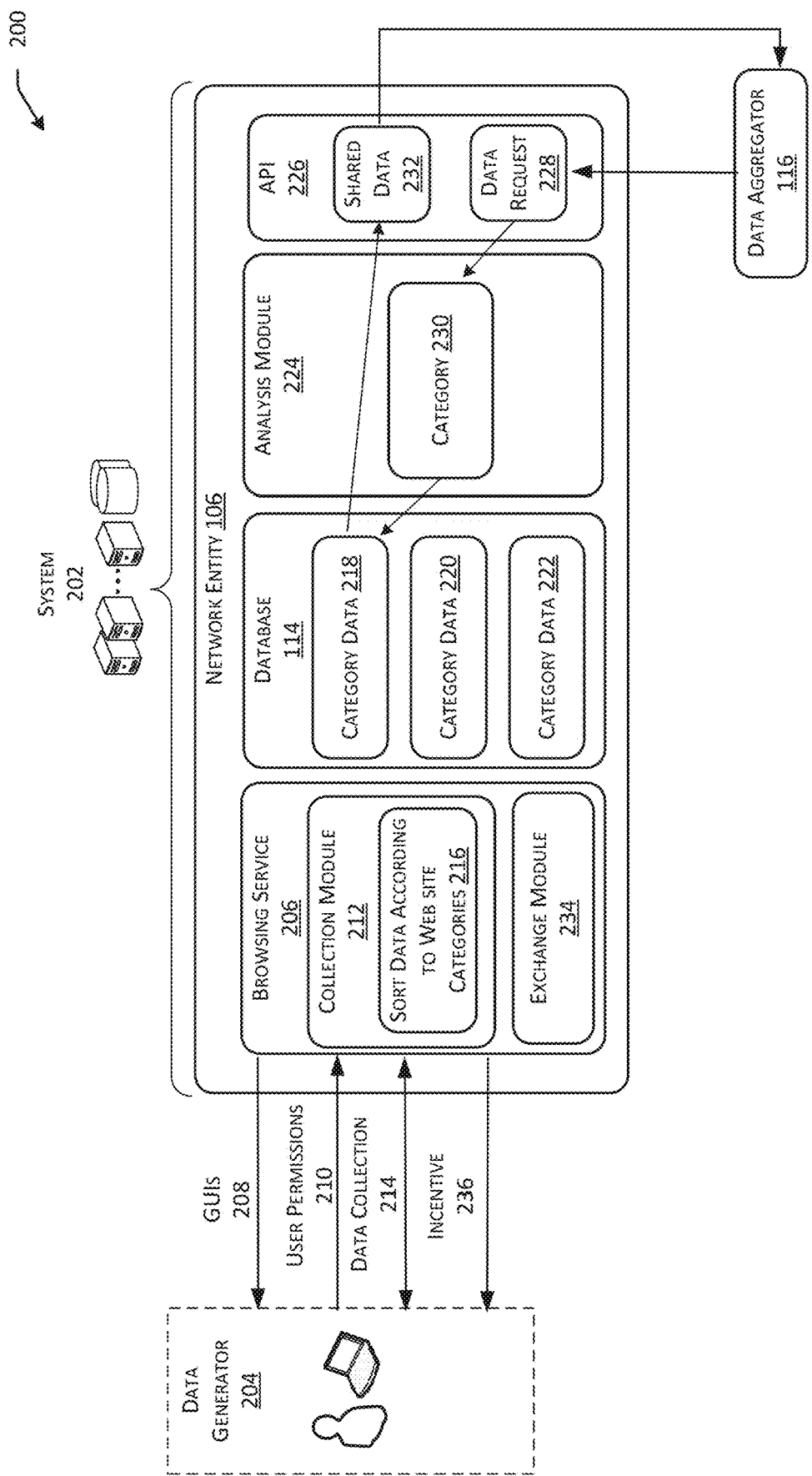
FIG. 2 is a diagram illustrating an example environment in which a system operated by first party network entity can interact with a data generator to provide transparency and control with regard to how the user's browsing data is used by the third party data aggregator.

FIG. 2 is a diagram illustrating an example environment 200 in which a system 202 operated by a first party network entity 106 can interact with a data generator 204 (e.g., the user 102 and user device 104 illustrated in FIG. 1) to provide transparency and control with regard to how the user's browsing data is used by the third party data aggregator 116.

As shown, the system 202 includes a browsing service 206. As further described herein, the browsing service 206 is configured to provide the user with various graphical UIs 208 directed to receive user permissions 210 with regard to third party data sharing. For example, the system 202 can determine that a user has accessed the browsing service 206 (e.g., activated the client-side browsing component 108), and based on this determination, the system 202 can display a notification that guides the user to a browser settings dashboard with controls for how the user data can be shared with third party data aggregators.

The browsing service 206 includes a collection module 212 configured to implement data collection 214. As shown, the collection module 212 is included in the network-based system 202. However, it is understood in the context of this disclosure that the collection module 212 can work with client side components installed on the user devices (e.g., browsers, apps, sensors, OS components, etc.) to implement the data collection 214.

In various embodiments, the user can provide input at various level of granularity. For example, the graphical UI 208 can provide an option for the user to generally authorize the sharing of all of his or her browsing data with any data aggregator. In another example, the graphical UI 208 can provide options for the user to authorize the sharing of browsing data for individual ones of a plurality of categories of web sites.

To this end, the collection module 212 is further configured to sort collected data according to web site categories 216, and securely store the sorted data in various category data sets 218, 220, 222 in the database 114. The data sets 218, 220, 222 are configured for sharing, and thus, the sorted data is added to the data sets 218, 220, 222 in accordance with user permissions. Web site categories can be broadly or narrowly defined and can include, for example: news sites (e.g., sports news sites, political news sites, financial news sites, etc.), streaming sites, shopping sites, travel sites, health sites, social networking sites, educational sites, etc.

An additional data category can include personal information for a user. This information may contain one or more of: an age or age range, a gender or gender identification, ethnicity, a profession, an income level, family information, personal interests, and so forth. In one example, a user's personal information can be defined via an account, which is password protected and used to access the browsing service 206. While the techniques described herein can be implemented on user browsing data that is not supplemented with this personal information, this personal information provides value when it supplements the user browsing data. Accordingly, via the techniques described herein, a user has the ability to define which aspects of his or her personal information can be used to supplement his or her browsing data.

The system 202 further includes an analysis module 224 and an application programming interface (API) 226. The system 202 exposes the API 226 to the third party data aggregator 116 so that the third party data aggregator 116 can submit a data request 228, via the API 226, for the user browsing data. The data request 228 may identify a category 230 of web sites. Alternatively, the data request 228 may include a data query and the analysis module 224 may evaluate the data query to identify a category 230 of web sites on which it is appropriate to execute the data query. The analysis module 224 then identifies and retrieves an appropriate category data set 218 for the data request 228 and shares the retrieved data 232 with the data aggregator 116 via the API 226.

In various embodiments, the browsing service 206 includes an exchange module 234 that enables the provision of an incentive 236 to the user. Accordingly, the user may be logged into a registered user account when using the browsing service 206 and the browsing service 206 can serve as an "exchange" platform that enables the valuable user browsing data to be passed to a data aggregator 116 in exchange for the incentive 236 offered by the data aggregator 116. For example, a free subscription to a media service may be applied to the registered user account so that the user can consume content that is typically behind a pay wall. In another example, cash back or a discount can be applied when a purchase is made via advertisements displayed via the browser and/or specific web sites.

It is understood in the context of this invention that the system 202 can replicate the aforementioned functionality across a large number of resources. Accordingly, in various examples, device(s) of the system 202 can include one or more computing devices that operate in a cluster or other grouped configuration to share resources, balance load, increase performance, provide fail-over support or redundancy, or for other purposes. For instance, device(s) of the system 102 can belong to a variety of classes of devices such as server-type devices, desktop computer-type devices, mobile-type devices, special purpose-type devices, etc. A user or client device used by a user to generate user browsing data can include, but is not limited to, a desktop computer, a game console and/or a gaming device, a tablet computer, a personal data assistant (PDA), a mobile phone/tablet hybrid, a laptop computer, a telecommunication device, a wearable device, a work station, an augmented or virtual reality device, an Internet-of-Things (IoT) device, an embedded device, or any other sort of computing device.

Further, the number of illustrated modules in FIG. 2 is just an example, and the number can vary higher or lower. That is, functionality described in association with the illustrated modules can be performed by a fewer number of modules or a larger number of modules on one device or spread across multiple devices.

As described above, the system 202 is configured to cause one or more graphical UIs to be displayed to the user on a user device. The graphical UIs enable the user to control how his or her browsing data is shared. Example graphical UIs are described below with respect to FIGS. 3A-3E. While separate graphical UIs are illustrated, it is understood in the context of this disclosure that the content communicated in the graphical UIs can be presented in more or less graphical UIs. The graphical UIs are configured to present UI elements configured to receive input indicating whether the user allows or prevents the sharing of data collected via a browsing service.

Figure 3A:
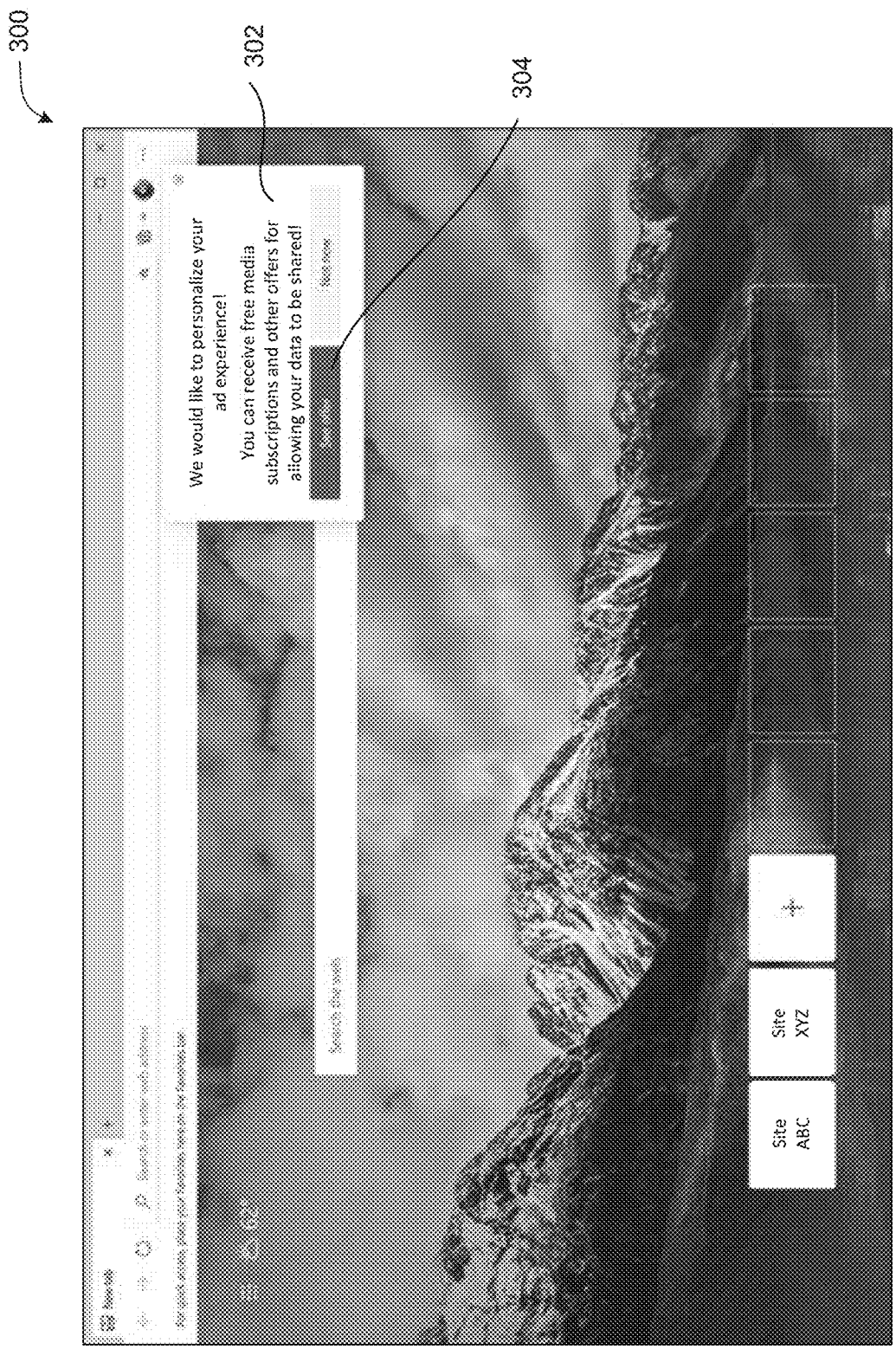
FIG. 3A is an example graphical user interface (UI) illustrating a notification that indicates a browsing service can provide incentives to a user in exchange for permission to share user browsing data with third party data aggregators.

FIG. 3A is an example graphical user interface (UI) 300 illustrating a notification 302 that indicates a browsing service can provide incentives to a user in exchange for permission to share user browsing data with third party data aggregators. The system 202 can determine that a user has initiated use of a browsing component. Based on this initiated use, the system 202 can provide the notification 302. Based on selection of a graphical UI element to see the "offers", the user may be taken to another graphical UI that enables management of browser exchange settings in accordance with a user account.

Figure 3B:
FIG. 3B is an example graphical UI illustrating a list of data aggregators that have requested that the user data be shared and functionality to receive input indicating whether the user allows or prevents sharing of the user browsing data.

FIG. 3B an example graphical UI 306 that presents a list of data aggregators that want the user to share his or her browsing data and functionality to receive input indicating whether the user allows or prevents sharing of the user browsing data. The graphical UI 306 can list the identities of one or more data aggregators (e.g., The Collector Co., Valuable Data Inc., Acme Retail Co., The Best Social Network, Best Ads Inc.). The user may be aware of the reputations of the entities listed, and thus, can decide whether or not to share his or her browsing data on an entity-by-entity basis by selecting different ones of the data aggregators.

Figure 3C:
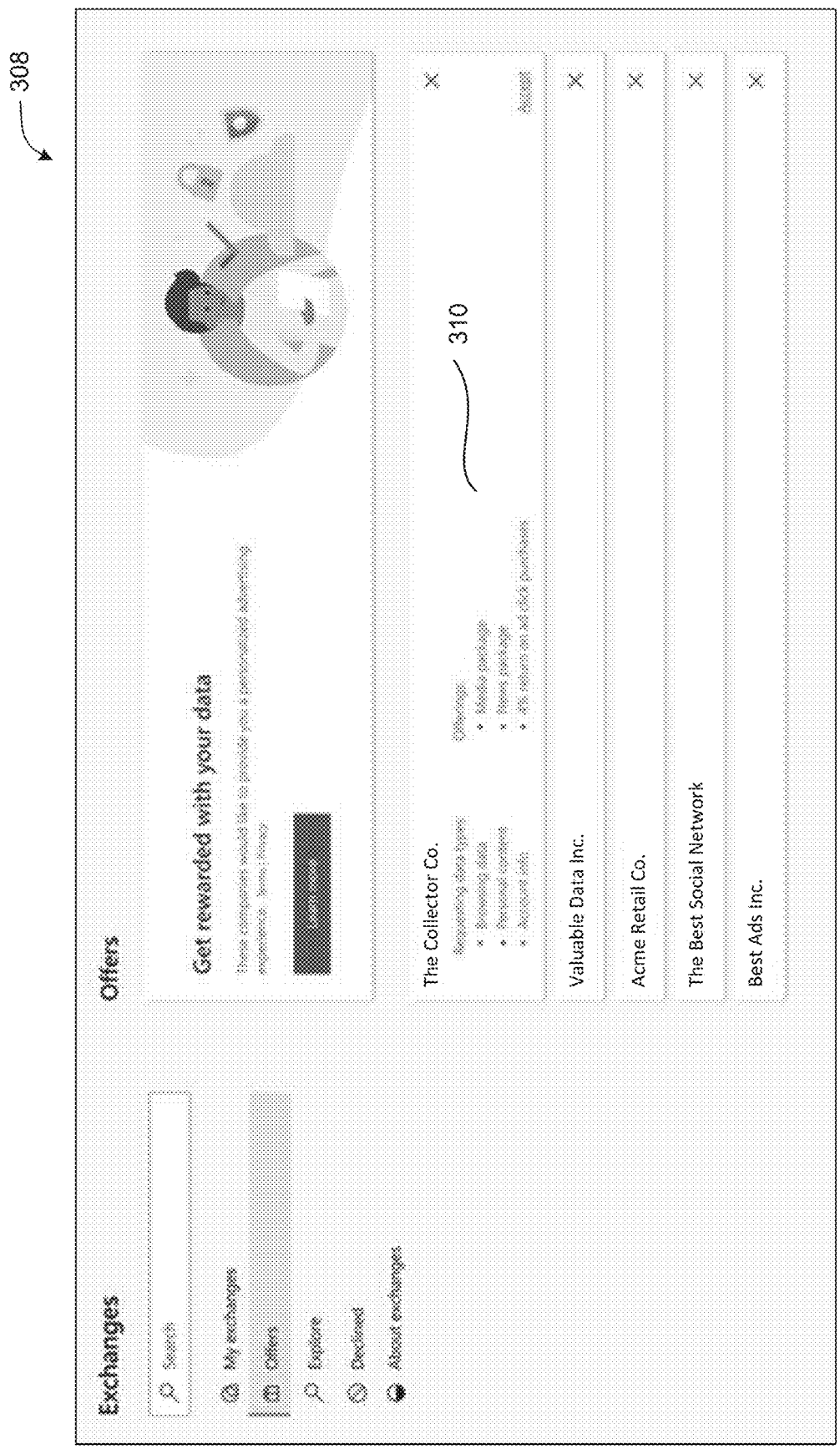
FIG. 3C is an example graphical UI illustrating incentives, or offers, for the user to allow for the sharing of his or her browsing data.

Before allowing his or her data to be shared with individual ones of the identified data aggregators, the user can view corresponding incentives offered by each of the data aggregators by clicking on a specific data aggregator, as shown via the graphical UI 308 illustrated in FIG. 3C. As shown via a selected drop down UI element 310, The Collector Co. is offering a media package, a news package, and 4% return (e.g., cash back) on ad click purchases, in exchange for the user sharing his or her browsing data and personal information. With user acceptance of the offer, the browser can share the user browsing data with The Collector Co. It is noted that the user browsing data may have already been collected or may yet to be collected, and the user can provide input indicating whether previously collected data can be shared. Upon sharing the user browsing data, the system can enable the incentive to be provided to the user via a user account.

Figure 3D:
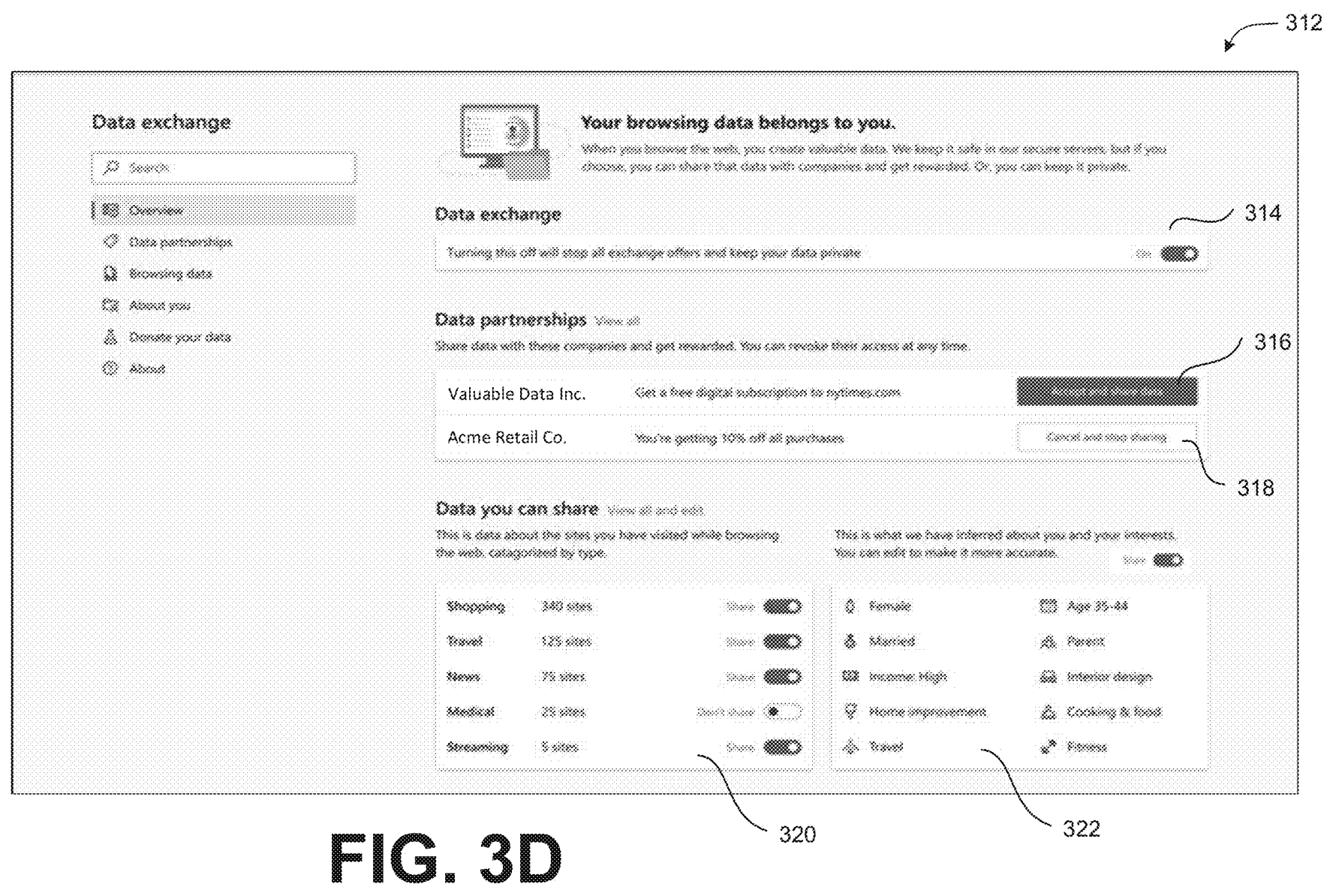

FIG. 3D is an example graphical UI 312 illustrating functionality to receive input indicating whether the user allows or prevents sharing of the user browsing data at a more granular level. As shown by element 314, the user indicated that he or she is willing to share browsing data. The example graphical UI 312 further illustrates the data exchanges for which the user has provided interest—a free digital subscription to New York Times provided by Valuable Data Inc. 316 (which has yet to be accepted by the user) and 10% off all purchases provided by Acme Retail Co. 318 (which has already been accepted by the user).

Further, the graphical UI 312 displays options for the user to control the sharing of browser data on a category-by-category basis. As shown by element 320, the user is allowing the sharing of browsing data for shopping sites, travel sites, news sites, and streaming sites. However, the user is not allowing the sharing of browsing data for medical sites.

Further, as shown by element 322, the user is allowing the sharing of personal information in addition to the browsing data. This personal information includes that the user is a married female, aged 35-44, that has "high" income and a child. The user has interests in home improvement, travel, interior design, cooking & food, and a fitness. While the user is allowing all this personal information to be shared, the user can also designate each piece of personal information for sharing (or not sharing). In some scenarios, the value of the incentives provided may reflect the amount of browsing data and/or personal information shared by the user. For example, the initial offer may be a baseline offer assuming all the user's browsing data and personal information is shared (e.g., 10% off all purchases). However, when some of the valuable browsing data and/or personal information is removed from sharing, the value of the offer may decrease (e.g., 8% off all purchases).

In other examples, a graphical UI can provide options for the user to authorize the sharing of browsing data and/or personal information for individual ones of a plurality of websites (e.g., the most common web sites visited by the user).

Consequently, the system 202 is fully transparent in that third party data aggregators requesting access to a user's browsing data are identified in a graphical UI. Moreover, a user can completely control the data that is shared to individual ones of the identified third party data aggregators.

Figure 3E:
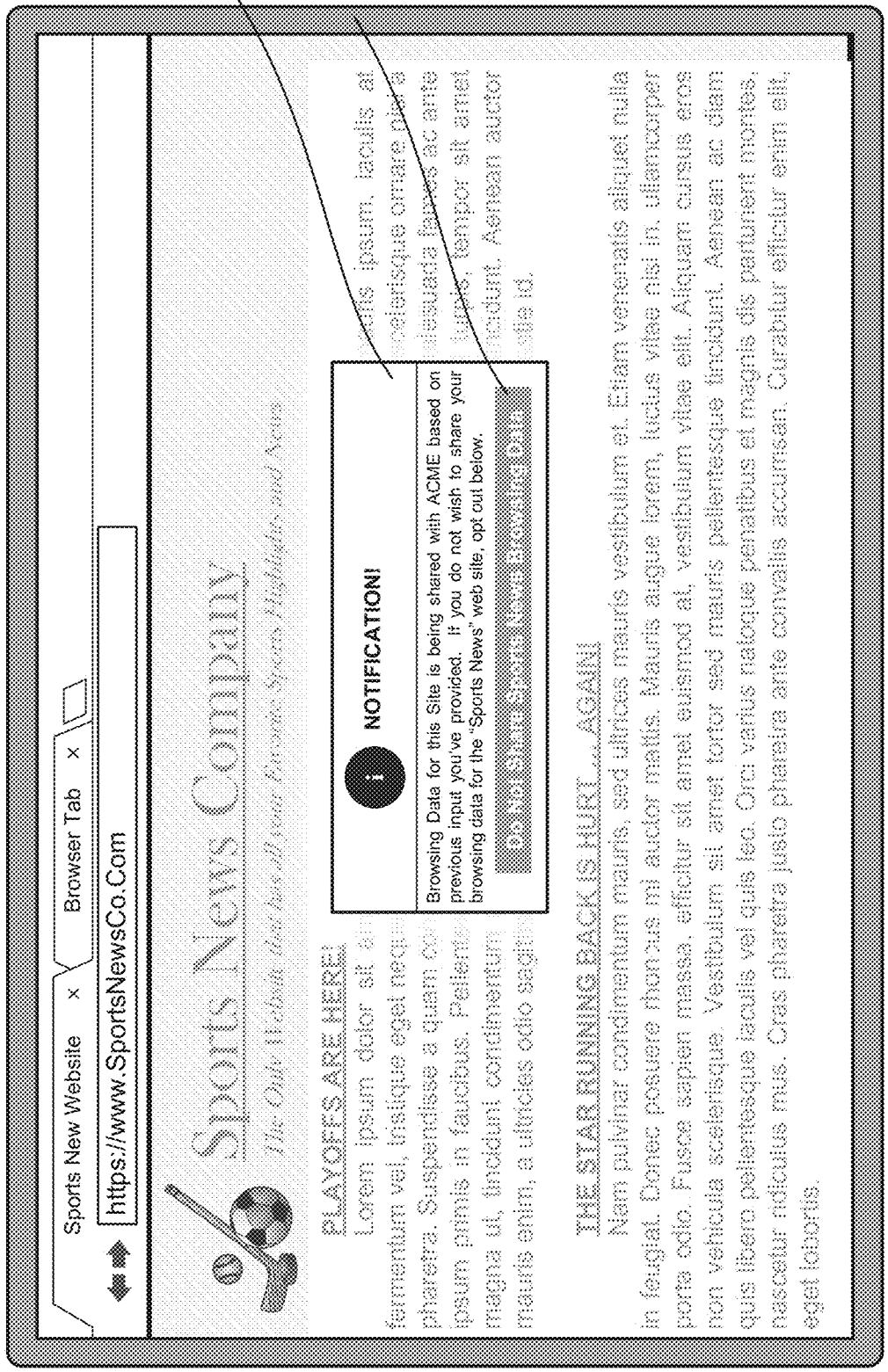
FIG. 3E is an example graphical UI illustrating a notification that browsing data for a specific site is being shared in accordance with user permissions.

In various examples, the system 202 can display a notification to the user while the user is browsing a specific web site for which the browsing data is being shared. FIG. 3E illustrates an example graphical UI 324 that displays such a notification 326 while the user is accessing a site from the Sports News Co. The notification 326 indicates that browsing data for the Sports News Co. site is going to be shared with Acme in accordance with previously provided input. In some implementations, the notification can provide the user with an opportunity 328 to prevent the sharing of the current session's browsing data for the specific web site (e.g., via selection of the graphical UI element that says "Do Not Share Sports News Browsing Data").

Figure 4:
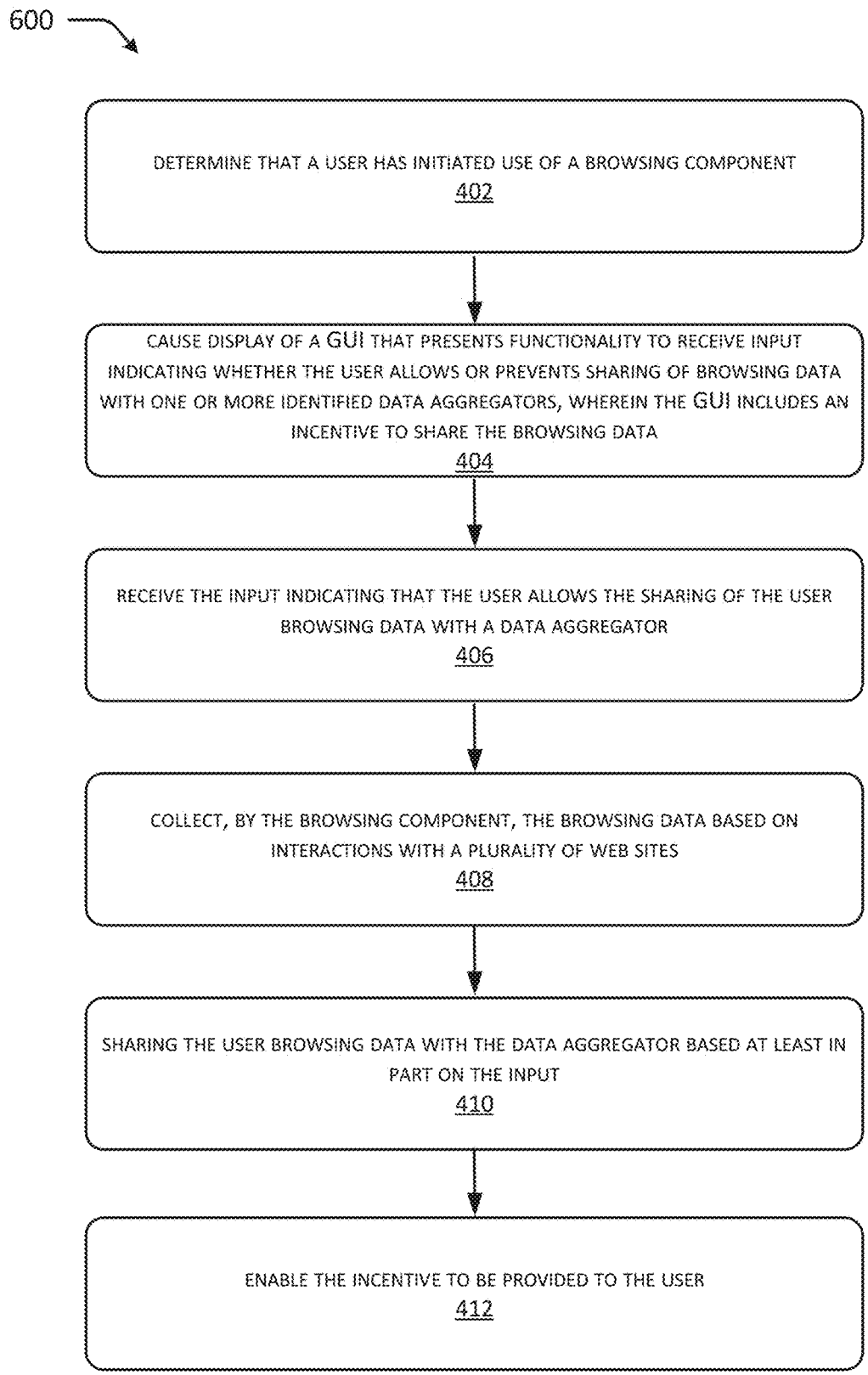
FIG. 4 is a flow diagram of an example method for receiving input indicating whether the user allows or prevents sharing of browsing data and sharing the data in accordance with the user input.

FIG. 4 represents an example process in accordance with various examples from the description of FIGS. 1-3E. The example operations shown in FIG. 4 can be implemented on or otherwise embodied in one or more device(s) of the system 202.

The order in which the operations are described is not intended to be construed as a limitation, and any number of the described operations can be combined in any order and/or in parallel to implement the process. Moreover, the operations in FIG. 4 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations.

FIG. 4 is a flow diagram of an example method 400 for receiving input indicating whether the user allows or prevents sharing of browsing data and sharing the data in accordance with the user input.

At operation 402, it is determined that a user has initiated use of a browsing component. At operation 404, a graphical UI presents functionality to receive input indicating whether the user allows or prevents sharing of the user browsing data with a data aggregator is displayed. The graphical UI includes an identity of the data aggregator. Moreover, the graphical UI can include an incentive for the user to share the user browsing data with the identified data aggregator.

At operation 406, input indicating that the user allows the sharing of the user browsing data with the data aggregator is received. At operation 408, user browsing data based on interactions with a plurality of web sites is collected by the browsing component.

At operation 410, the user browsing data is shared with the data aggregator based on the input. At operation 412, the system 202 enables the incentive to be provided to the user.

FIG. 5 shows additional details of an example computer architecture 500 for a device, such as a computer or a server configured as part of the system 202, capable of executing computer instructions (e.g., a module or a program component described herein). The computer architecture 500 illustrated in FIG. 5 includes processing unit(s) 502, a system memory 504, including a random access memory 506 ("RAM") and a read-only memory ("ROM") 508, and a system bus 510 that couples the memory 504 to the processing unit(s) 502.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518 (e.g., the collection module, the analysis module, etc.), and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network(s) 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

Network(s) 520 can include, for example, public networks such as the Internet, private networks such as an institutional and/or personal intranet, or some combination of private and public networks. Network(s) 520 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 520 can utilize communications protocols, including packet-based and/or datagram-based protocols such as internet protocol (IP), transmission control protocol (TCP), user datagram protocol (UDP), or other types of protocols. Moreover, network(s) 520 can also include a number of devices that facilitate network communications and/or form a hardware basis for the networks, such as switches, routers, gateways, access points, firewalls, base stations, repeaters, backbone devices, and the like.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

The disclosure presented herein also encompasses the subject matter set forth in the following clauses.

Example Clause A, a method for an entity to transparently share user browsing data with a data aggregator, comprising: determining, by one or more processing units, that a user has initiated use of a browsing component; causing display of a graphical user interface (UI) that presents a plurality of categories of web sites and corresponding functionality to receive input indicating whether the user allows or prevents sharing of the user browsing data for individual ones of the plurality of categories of web sites with the data aggregator, wherein the graphical UI includes an identity of the data aggregator and an incentive for the user to share the user browsing data with the data aggregator; receiving the input indicating that the user allows the sharing of the user browsing data for a particular category of web sites, of the plurality of categories of web sites, with the data aggregator; collecting, by the browsing component, the user browsing data based on interactions with a plurality of web sites that belong to the particular category of web sites; sharing the user browsing data with the data aggregator based at least in part on the input; and enabling the incentive to be provided to the user.

Example Clause B, the method of Example Clause A, wherein the graphical UI lists multiple data aggregators, each of the multiple data aggregators offering a corresponding incentive for the user to allow the sharing of the user browsing data.

Example Clause C, the method of Example Clause A or Example Clause B, wherein the graphical UI is displayed based on selection of a pop up notification displayed at an onset of a browsing experience.

Example Clause D, the method of any one of Example Clauses A through C, further comprising notifying the user that the user browsing data is being shared with the data aggregator while the user browses individual ones of the plurality of web sites that belong to the particular category of web sites.

Example Clause E, the method of any one of Example Clauses A through D, wherein the incentive is offered by the data aggregator.

Example Clause F, the method of any one of Example Clauses A through E, wherein provision of the incentive is enabled via a user account registered for the browsing component.

Example Clause G, a system for an entity to transparently share user browsing data with a data aggregator, comprising: one or more processing units; and computer-readable storage media storing instructions that, when executed by the one or more processing units, cause the system to perform operations comprising: determining that a user has initiated use of a browsing component; causing display of a graphical user interface (UI) that presents functionality to receive input indicating whether the user allows or prevents sharing of the user browsing data with the data aggregator, wherein the graphical UI includes an identity of the data aggregator and an incentive for the user to share the user browsing data with the data aggregator; receiving the input indicating that the user allows the sharing of the user browsing data with the data aggregator; collecting, by the browsing component, the user browsing data based on interactions with a plurality of web sites; sharing the user browsing data with the data aggregator based at least in part on the input; and enabling the incentive to be provided to the user.

Example Clause H, the system of Example Clause G, wherein: the graphical UI presents a plurality of categories of web sites and corresponding functionality to receive input indicating whether the user allows or prevents sharing of the user browsing data for individual ones of the plurality of categories of web sites; and the input indicates that the user allows the sharing of the user browsing data for a particular category of web sites of the plurality of categories of web sites.

Example Clause I, the system of Example Clause G, wherein: the graphical UI presents a plurality of web sites and corresponding functionality to receive input indicating whether the user allows or prevents sharing of the user browsing data for individual ones of the plurality of web sites; and the input indicates that the user allows the sharing of the user browsing data for a particular web site of the plurality of web sites.

Example Clause J, the system of any one of Example Clauses G through I, wherein the input indicates that the user allows the sharing of account information to supplement the user browsing data shared with the data aggregator.

Example Clause K, the system of any one of Example Clauses G through J, wherein the input indicates that the user allows the sharing of personal information to supplement the user browsing data shared with the data aggregator.

Example Clause L, the system of any one of Example Clauses G through K, wherein the graphical UI lists multiple data aggregators, each of the multiple data aggregators offering a corresponding incentive for the user to allow the sharing of the user browsing data.

Example Clause M, the system of any one of Example Clauses G through L, wherein the graphical UI is displayed based on selection of a pop up notification displayed at an onset of a browsing experience.

Example Clause N, the system of any one of Example Clauses G through M, wherein the operations further comprise notifying the user that the user browsing data is being shared with the data aggregator while the user browses individual ones of the plurality of web sites.

Example Clause O, the system of any one of Example Clauses G through N, wherein the incentive is offered by the data aggregator.

Example Clause P, the system of any one of Example Clauses G through O, wherein provision of the incentive is enabled via a user account registered for the browsing component.

Example Clause Q, a computer readable storage medium that stores instructions that, when executed by one or more processing units, cause a system to perform operations comprising: determining that a user has initiated use of a browsing component; causing display of a graphical user interface (UI) that presents functionality to receive input indicating whether the user allows or prevents sharing of the user browsing data with the data aggregator, wherein the graphical UI includes an identity of the data aggregator and an incentive for the user to share the user browsing data with the data aggregator; receiving the input indicating that the user allows the sharing of the user browsing data with the data aggregator; collecting, by the browsing component, the user browsing data based on interactions with a plurality of web sites; and sharing the user browsing data with the data aggregator based at least in part on the input; and enabling the incentive to be provided to the user.

Example Clause R, the computer readable storage medium of Example Clause Q, wherein the input indicates that the user allows the sharing of personal information to supplement the user browsing data shared with the data aggregator.

Example Clause S, the computer readable storage medium of Example Clause Q or Example Clause R, wherein the operations further comprise notifying the user that the user browsing data is being shared with the data aggregator while the user browses individual ones of the plurality of web sites.

Example Clause T, the computer readable storage medium of any one of Example Clauses Q through S, wherein the graphical UI lists multiple data aggregators, each of the multiple data aggregators offering a corresponding incentive for the user to allow the sharing of the user browsing data.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two different operations, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method for an entity to transparently share user browsing data with a data aggregator, comprising:
   determining, by one or more processing units, that a user has initiated use of a browsing component;
   causing display of a graphical user interface (UI) that presents:
      identities for a plurality of data aggregators and corresponding functionality to receive first input that selects a data aggregator from the plurality of data aggregators, each of the plurality of data aggregators offering a corresponding incentive for the user to allow the sharing of the user browsing data; and
      a plurality of categories of web sites and corresponding functionality to receive second input indicating whether the user allows or prevents sharing of the user browsing data for each of the plurality of categories of web sites;
   receiving the first input that selects the data aggregator from the plurality of data aggregators;
   receiving the second input indicating that the user allows the sharing of the user browsing data for a particular category of web sites, of the plurality of categories of web sites, with the data aggregator;
   collecting, by the browsing component, the user browsing data based on interactions with a plurality of web sites that belong to the particular category of web sites;
   sharing the user browsing data with the data aggregator based at least in part on the first input and the second input; and
   enabling the incentive offered by the data aggregator to be provided to the user.

2. The method of claim 1, wherein the graphical UI is displayed based on a user selection of a pop up notification displayed at an onset of a browsing experience.

3. The method of claim 1, further comprising notifying the user that the user browsing data is being shared with the data aggregator while the user browses individual ones of the plurality of web sites that belong to the particular category of web sites.

4. The method of claim 3, further comprising configuring a selectable graphical user interface element in a notification that, when selected, prevents further sharing of the user browsing data with the data aggregator.

5. The method of claim 1, wherein provision of the incentive is enabled via a user account registered for the browsing component.

6. The system of claim 1, wherein the operations further comprise configuring a selectable graphical user interface element in a notification that, when selected, prevents further sharing of the user browsing data with the data aggregator.

7. A system for an entity to transparently share user browsing data, comprising:
   one or more processing units; and
   computer-readable storage media storing instructions that, when executed by the one or more processing units, cause the system to perform operations comprising:
      determining that a user has initiated use of a browsing component;
      causing display of a graphical user interface (UI) that presents:
         identities for a plurality of data aggregators and corresponding functionality to receive first input indicating whether the user allows or prevents sharing of the user browsing data with individual ones of the plurality of data aggregators, each of the plurality of data aggregators offering an incentive for the user to share the user browsing data; and
         a web site and corresponding functionality to receive second input indicating whether the user allows or prevents sharing of the user browsing data for the web site;
      receiving the first input indicating that the user allows the sharing of the user browsing data with a data aggregator of the plurality of data aggregators;

receiving the second input indicating that the user allows the sharing of the user browsing data for the web site with the data aggregator;

collecting, by the browsing component, the user browsing data based on interactions with the web site;

sharing the user browsing data with the data aggregator based at least in part on the first input and the second input; and enabling the incentive offered by the data aggregator to be provided to the user.

8. The system of claim 7, wherein the first input indicates that the user allows the sharing of account information to supplement the user browsing data shared with the data aggregator.

9. The system of claim 7, wherein the first input indicates that the user allows the sharing of personal information to supplement the user browsing data shared with the data aggregator.

10. The system of claim 7, wherein the graphical UI is displayed based on a user selection of a pop up notification displayed at an onset of a browsing experience.

11. The system of claim 7, wherein the operations further comprise notifying the user that the user browsing data is being shared with the data aggregator while the user browses the web site.

12. The system of claim 7, wherein provision of the incentive is enabled via a user account registered for the browsing component.

13. A computer readable storage medium that stores instructions that, when executed by one or more processing units, cause a system to perform operations comprising:

determining that a user has initiated use of a browsing component;

causing display of a graphical user interface (UI) that presents:

identities for a plurality of data aggregators and corresponding functionality to receive first input indicating whether the user allows or prevents sharing of user browsing data and personal information to supplement the user browsing data with individual ones of the plurality of data aggregators, each of the plurality of data aggregators offering an incentive for the user to share the user browsing data and the personal information; and a plurality of categories of web sites and corresponding functionality to receive second input indicating whether the user allows or prevents sharing of the user browsing data and the personal information for each of the plurality of categories of web sites;

receiving the first input that selects a data aggregator from the plurality of data aggregators;

receiving the second input indicating that the user allows the sharing of the user browsing data and the personal information for a particular category of web sites, of the plurality of categories of web sites, with the data aggregator;

collecting, by the browsing component, the user browsing data based on interactions with a plurality of web sites that belong to the particular category of web sites; and sharing the user browsing data and the personal information with the data aggregator based at least in part on the first input and the second input; and enabling the incentive offered by the data aggregator to be provided to the user.

14. The computer readable storage medium of claim 13, wherein the personal information comprises an age of the user, a gender of the user, an ethnicity of the user, a profession of the user, or an income of the user.

15. The computer readable storage medium of claim 13, wherein the operations further comprise notifying the user that the user browsing data is being shared with the data aggregator while the user browses individual ones of the plurality of web sites.

16. The computer readable storage medium of claim 15, wherein the operations further comprise configuring a selectable graphical user interface element in a notification that, when selected, prevents further sharing of the user browsing data with the data aggregator.

\* \* \* \* \*